Dec. 15, 1953  R. G. BALLARD ET AL  2,662,410
TORQUE COMPENSATOR
Filed Dec. 22, 1949  2 Sheets-Sheet 1
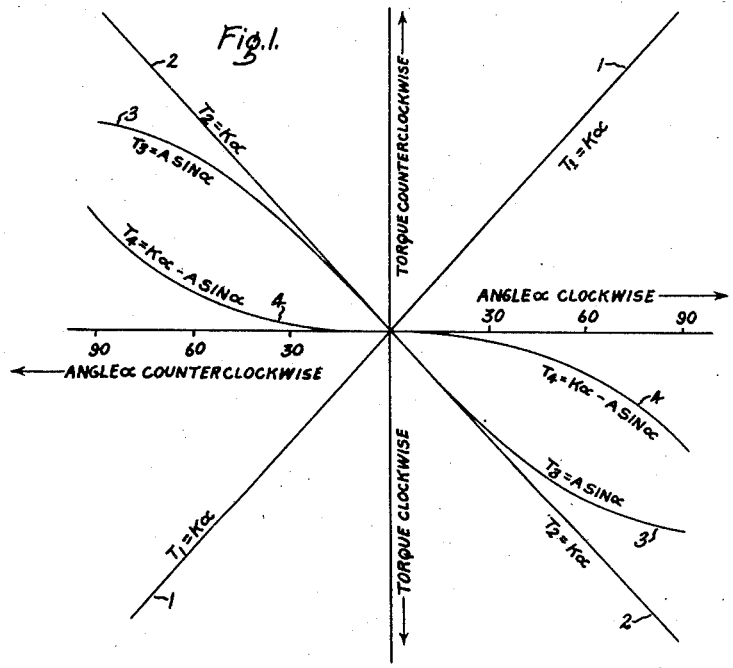
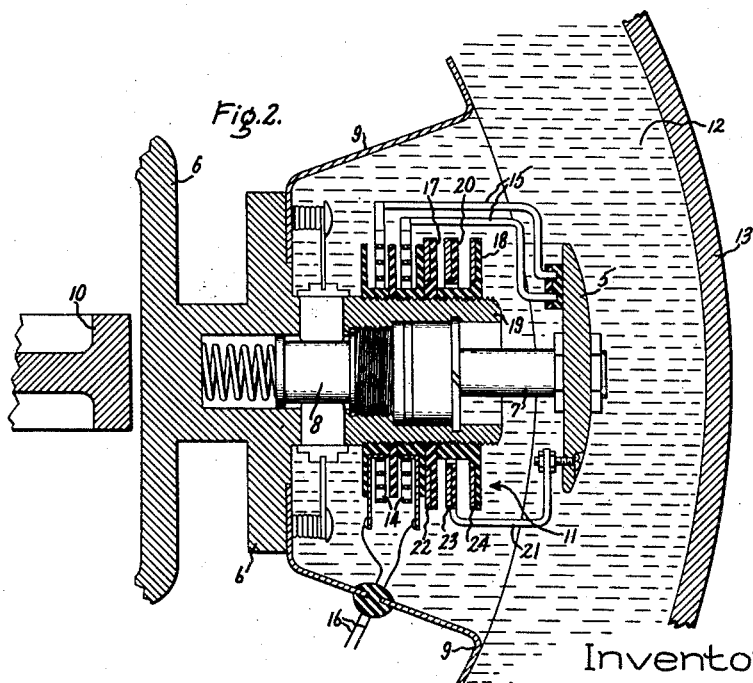
Inventors:
Robert G. Ballard,
John E. Lundberg,
by Russell A. Warner
Their Attorney.

Dec. 15, 1953    R. G. BALLARD ET AL    2,662,410
TORQUE COMPENSATOR
Filed Dec. 22, 1949    2 Sheets-Sheet 2
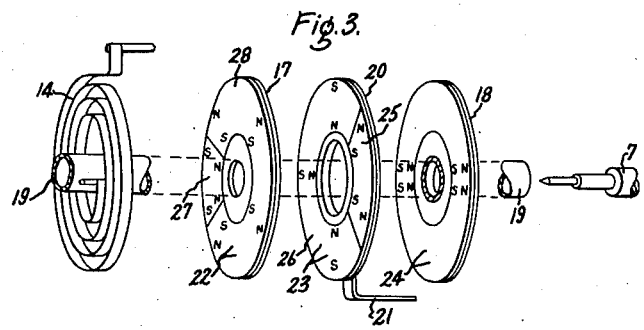
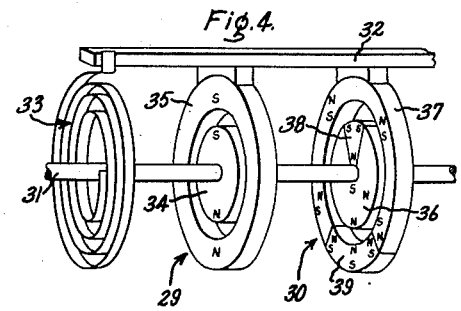
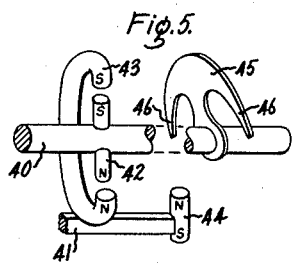
Inventors:
Robert G. Ballard,
John E. Lundberg,
by Russell A. Warner
Their Attorney.

Patented Dec. 15, 1953

2,662,410

UNITED STATES PATENT OFFICE 2,662,410

TORQUE COMPENSATOR

Robert G. Ballard, Saugus, and John E. Lundberg, Lynn, Mass., assignors to General Electric Company, a corporation of New York Application December 22, 1949, Serial No. 134,548

10 Claims. (Cl. 74—5.4)

The present invention relates to torque compensating systems and, more particularly, to arrangements for minimizing the net torque between relatively rotatable gyroscope members interconnected by current-conducting spirals.

Flat spiral springs have long been satisfactorily employed to conduct current between elements which are to be angularly displaced and which are not adversely affected by the spring action thereof, as, for example, in moving coil instruments wherein the spiral springs also serve to return a pointer to a neutral position when current ceases. Since current-conducting spirals do not occasion the undesirable friction and contact resistance which are experienced with slip-ring structures, these spirals may be of utility in accomplishing the excitation of an electric gyroscope motor by translating the electric power from conductors on a gimbal to the motor mounted on a frame pivoted with the gimbal. However, in sensitive gyroscope apparatus, deflections of the spirals from a neutral position introduce torques between the gimbal and motor frame and thereby create objectionable precession. In accordance with this invention, these torques are effectively neutralized by structures which apply substantially equal torques in direct opposition to the spiral torques throughout the entire permissible range of deflections between the gyro gimbal and motor frame.

Compensator arrangements having the desired torque versus angular displacement characteristics are produced in accord with the subject invention by combinations of magnetically interacting members coupled with each of the relatively rotatable units connected by the current-conducting spirals. Further, the net torque versus angular displacement characteristics exhibited by the compensator structure alone obtains from the resultant of a plurality of individual characteristics produced by magnetically interacting members.

It is therefore one object of the present invention to provide a torque compensator which produces a predetermined torque versus angular displacement characteristic between relatively rotatable members by the magnetic interaction between elements carried by said members.

A second object is to provide magnetically interacting means for eliminating net torques introduced by spirals coupled between the motor frame and supporting gimbal of a gyroscope over a substantially 180 degree range of displacements.

Additionally it is an object to provide a plurality of magnetically interacting members having a resultant torque versus angular displacement characteristic which just neutralizes the torque versus displacement characteristic of a spiral structure coupled between a gyroscope motor frame and gimbal.

These and other objects and features of this invention may be most effectively observed with reference to the following description and the accompanying drawings, wherein:

Fig. 1 depicts graphically the torque characteristics of a spiral conductor and compensator arrangements therefor;

Fig. 2 illustrates, in an axial cross-section view, a portion of a floated gyroscope type instrument incorporating current-conducting spirals and a preferred torque compensator structure;

Fig. 3 presents a pictorial view of a torque compensator such as that of Fig. 2; and Figs. 4 and 5 pictorially represent additional embodiments of torque compensating arrangements.

In Fig. 1, the straight-line plot 1 is illustrative of the counterclockwise and clockwise torque introduced between two relatively rotatable members by spiral conductors or springs as the members are angularly displaced up to 90 degrees in the clockwise and counterclockwise directions respectively from that position in which the spiral is at neutral equilibrium, and it should be observed that the equation for this plot is: $T_1 = K\alpha$, where $T_1$ is the spiral torque, K is a constant dependent upon the spiral construction and number of spirals, and $\alpha$ is the angular displacement of the attached members. The plot 2 is that of the torque $T_2$ which must be applied between the rotatable members to exactly overcome the spiral torque, with the sense of this former torque reversed with respect to the latter such that a clockwise spiral torque will be just neutralized by a counterclockwise compensator torque, and vice versa. A reduction of the net torque between the rotatable members to zero for all angular displacements up to and including 90 degrees in both directions from a neutral position thus requires that the compensator device also have the characteristic $T_2 = K\alpha$, where $T_2$ is the resultant compensator torque equal to the spiral torque but of opposite sense, K is a constant, and $\alpha$ is the angular displacement between the rotatable members. As explained in detail hereinafter, this compensator torque characteristic may be readily produced by compensator elements which conveniently yield the torque characteristics $$T_3 = A \sin \alpha$$

and $T_4 = Ka - a \sin a$, which are plots 3 and 4, respectively, in Fig. 1. From a summation of these characteristics it is apparent that $$T_2 = T_3 + T_4 = T_1 = A \sin a + Ka - A \sin a = Ka,$$

which is the desired resultant.

Particularly advantageous utilization of this invention, though not limited thereto, appears in its application as a compensator for the torque introduced by spirals between the rotor bearing member and gimbal support therefor in a floated gyroscope type instrument illustrated in part in Fig. 2. For a more detailed disclosure of such instruments wherein the entire gimbal and rotor bearing members in combination are immersed in a liquid such that the weights thereof are just supported by the liquid, reference should be had to the copending application of F. V. Johnson and F. R. Fowler, Serial No. 171,582, filed July 1, 1950, for Floated Gyroscopes, assigned to the same assignee as that of the present application. In the floated gyroscope of Fig. 2, the gimbal 5 and rotor bearing member 6 are pivotally coupled by the journalling shaft 7 and sensitive low friction bearing 8, and, in accordance with the teachings of the above noted copending application, the rotor bearing member 6 included a fluid-tight container 9 which prevents fluid from reaching the gyro rotor 10, shown in part, and the motive means therefor, not illustrated. The entire structure, inclusive of the rotor bearing member 6, gimbal 5, and the torque compensator arrangement 11 of this invention, is buoyed by the liquid 12 which fills the remaining volume between the container 9 and the liquid-tight outer casing 13. Frictional restraint of rotation between gimbal 5 and member 6 is so minute in the floated instrument that spiral current conductors 14, which may serve to translate the power from leads 15 on gimbal 5 to the gyro motor supply leads 16 within container 9, would apply torques which would cause intolerable precession unless compensation therefor were introduced. Accordingly, the compensator structure designated generally by the numeral 11 is coupled with both member 6 and gimbal 5 and applies therebetween the torques $T_2$ of plot 2 in Fig. 1 to just neutralize the equal but opposite torques of spirals 14. Compensator 11 includes two annular non-magnetic plates 17 and 18, which are spaced from one another and which are affixed to the projection 19 of member 6 coaxially with the journalling shaft 7, and a third annular non-magnetic plate 20 positioned intermediate plates 17 and 18 and affixed to gimbal 5 and spaced from projection 19 by supporting members 21. The plates 17, 20 and 18, which may, for example, be constructed of aluminum, carry annular permanent magnet structures 22, 23 and 24, respectively, and the interaction between these magnet structures produces the required torque characteristics.

Operation of the compensator arrangement may be more easily comprehended with reference to Fig. 3 which views pictorially portions of the assembly shown by Fig. 2 when spirals 14 are in the stable centralized position, neither wound nor unwound. It should be apparent that relative angular displacement between plates 17 and 18, fixedly held by projection 19, and the intermediate plate 20, held by gimbal 5, occurs when the gimbal and rotor bearing member 6 are similarly displaced, and the magnetic interaction between magnetic structures 22 and 24 and the intermediate magnetic structure 23 creates the desired neutralizing torque. The annular magnetic plate 24 is magnetized diametrically with its magnetic poles substantially along a diameter of the plate, the arrangement being such that south (S) poles are innermost and north (N) poles outermost on one-half of this diameter, and the reverse polarization exists on the opposite half. Magnetic plate 23, with which plate 24 interacts, is comprised of a small sector 25 and a larger sector 26, both of which sectors are radially polarized with the directions of polarization reversed from one another. When plates 24 and 23 are initially oriented as shown in Fig. 3, the poles of plate 24 are disposed opposite the centers of the two sectors of plate 23 and no relative torque is exerted between plates. However, any increment of displacement between these plates results in an instability, due to the fact that like poles are oppositely disposed, which tends to cause relative angular displacement therebetween until opposite poles are oppositely disposed and the plates are just 180 degrees displaced from the position illustrated. The torque versus angular displacement characteristic for the first 90 degrees of displacements between these plates is shown as plot 3 in Fig. 1, the torque $T_3$ being $A \sin a$, where A is a constant which is a function of pole strengths, plate spacings, and plate widths. The sector 25 is preferably selected to have an angular width of approximately 110 degrees, the selection of this width being determinative of the substantially sinusoidal relationship between the torque and displacement, although it should be understood that this function is merely illustrative and may be other than sinusoidal with equivalent results. Annular plate 22 is also comprised of a small sector 27, of about 110 degrees in angular width, and a larger sector 28, both of which are radially polarized, with the directions of polarization reversed from one another. When plates 23 and 22 are initially oriented as illustrated in Fig. 3, the smaller sectors 25 and 27 are 180 degrees displaced and no relative torque is experienced even though unlike poles are oppositely disposed over the sector angles. Since the larger sectors 26 and 28 have substantially uniform polarizations over their center portions, the increase in the tendency of the oppositely polarized smaller sectors 25 and 27 to align themselves is only slight for small angles of initial displacements and rises substantially only beyond about 30 degrees, such that the torque versus displacement characteristic up to about 90 degrees is substantially that of plot 4, Fig. 1, that is, $T_4 = Ka - A \sin a$. The constants may be adjusted by the appropriate proportioning of pole strengths, plate spacings, and plate widths, while the function of torque with reference to displacement may be fixed by a proper selection of the angular widths of smaller sectors 25 and 27. In the compensator structure set forth, the resultant torque characteristic is the summation of the two characteristics produced by the interaction of both plates 22 and 24 with the intermediate plate 23, and this resultant is that of plot 2, Fig. 1, which is substantially equal and opposite to the spiral characteristic. Thus, for displacements between gimbal 5 and the rotor bearing member 6 up to 90 degrees in either direction from a neutral position, the effective torque is negligible.

Another embodiment of a torque compensator in accordance with this invention is represented in Fig. 4 and is shown to include two units 29 and 30, each independently producing one of the required torques. Relative angular movement between the shaft 31 and member 32 is contemplated, and at least one spiral 33 is connected therebetween. Unit 29 includes a cylindrical member 34 attached to shaft 31 and an outer annular cylindrical member 35 affixed to member 32. Members 34 and 35 are each polarized along a diameter, and it is apparent that the torque therebetween will be equal to $A \sin a$, or that of plot 3 in Fig. 1. Unit 30 also comprises a cylindrical member 36 attached to shaft 31, and an outer annular cylindrical member 37 supported by member 32. Cylindrical members 36 and 37 are radially polarized, and each has a small sector 38 and 39, respectively, which has a radial polarization opposite to the polarization of the remainder of the member and in the same radial direction as the other small sector. As in the arrangement of Fig. 3, these sectors are 180 degrees removed at the neutral or zero torque position, and the torque characteristic, such as plot 4 in Fig. 1, is achieved by a similar magnetic interaction.

Fig. 5 illustrates alternative structures for creating the required compensator torques between two relatively rotatable elements 40 and 41. The rod-shaped magnet 42 produces a torque equal to $A \sin a$ in cooperation with the C-shaped magnet 43, it being clear that this torque characteristic is one which may be achieved by any permanent magnet rotatable in a unidirectional field. The torque $Ka - A \sin a$ is obtained in this embodiment by the permanent magnet 44 in operative relationship with the member 45 constructed of magnetic material which is shaped and disposed to provide the desired characteristic. Member 45 is attracted to magnet 44 such that it will orient itself to offer the lowest reluctance to the flux from the magnet, that is, such that member 45 is 180 degrees displaced from the illustrated position. The outwardly flaring arms 46 of member 45 bear a configuration which aids in securing the necessary increasing torque, and the slant at which member 45 is affixed to shaft element 40 also contributes to the realization of this characteristic.

It should be apparent that the present invention is susceptible of modification in numerous ways without departure from the spirit or scope thereof. By way of illustration, it is contemplated that the torque compensator arrangement may be inclusive of any of the above described elements, both magnetized and of magnetic materials, and that the resultant torque characteristics may be other than linear if such compensation is required. Additionally, the structures disclosed may be adapted to serve spring rather than compensator functions, with the characteristic of either plot 1 or plot 2 of Fig. 1.

While particular embodiments of the subject invention have been shown and described herein, these are in the nature of description rather than limitation, and it will occur to those skilled in the art that various changes, modifications and combinations may be made within the province of the appended claims without departing either in spirit or scope from this invention in its broader aspects.

What we claim as new and desire to secure by Letters Patent of the United States is:

1. In an arrangement including two relatively rotatable parts coupled together by a resilient spiral structure which produces torque variable with relative rotation of said parts, a torque compensator comprising a first magnetized member affixed to one of said parts, a second magnetized member affixed to the other of said parts, said first and second members being positioned and magnetized such that the torque therebetween due to the interaction of their magnetic fields is substantially proportional to the sine of the angular displacement therebetween and in an angular direction opposite to that of the spiral structure torque, and a third magnetized member affixed to said other part, said first and third members being positioned and magnetized such that the torque therebetween due to the interaction of their magnetic fields is substantially equal to the spiral structure torque less the torque between said first and second members and in an angular direction opposite to that of the spiral structure torque.

2. In an arrangement including two relatively rotatable parts coupled together by a resilient spiral structure which produces torque variable with relative rotation of said parts susceptible to torque by relative rotation of said parts, a torque compensator comprising first means coupled with said parts magnetically interacting to produce a torque between said parts substantially proportional to the sine of the angular displacement therebetween and in a direction opposite to that of the spiral structure torque, and second means coupled with said parts magnetically interacting to produce a torque between said parts substantially equal to said spiral structure torque less the torque of said first means and in an angular direction opposite to that of said spiral structure torque.

3. An arrangement for producing between relatively rotatable parts torques which increase linearly with angular displacements from a neutral position and which act in the same angular direction as said displacements, comprising first magnetized means coupled with one of said parts, second magnetized means coupled with another of said parts, said first and second means being positioned and magnetized such that the torque therebetween due to the interaction of their magnetic fields is substantially proportional to the sine of the angular displacement therebetween and in an angular direction tending to increase said displacement, and third magnetized means coupled with said other part, said first and third means being positioned and magnetized such that the torque therebetween due to the interaction of their magnetic fields is substantially equal to said linearly increasing torque less the torque between said first and second means and in an angular direction tending to increase displacement from said neutral position.

4. In an arrangement including two relatively rotatable parts coupled together by a resilient spiral structure, the torque compensator comprising a first member mounted on one of said parts and producing a unidirectional magnetic field, a second member mounted on the other of said parts and having magnetic poles along one axis thereof, said second member being disposed in the field of said first member, and means coupled with said parts magnetically interacting to produce a torque between said parts substantially equal to the spiral structure torque less the torque between said first and second members.

5. An arrangement as set forth according to claim 4 wherein said means comprises a permanent magnet coupled with one of said parts, and a plate of magnetic material coupled with the other of said parts shaped and disposed to produce said torque between said parts in tending to align itself to provide the lowest reluctance path for the flux from said magnet.

6. In a gyro instrument having a spiral current conductor arrangement between the relatively rotatable rotor bearing structure and gimbal support therefor, a compensator for torque introduced by said spiral arrangement comprising a first plate coupled with said rotor bearing structure and magnetized in one direction along a diameter thereof, a second plate coupled with said gimbal and disposed coaxially and proximately with said first plate, said second plate having a small sector magnetically polarized in one radial direction and a large sector magnetically polarized in the opposite radial direction, and a third plate, coupled with said rotor bearing structure coaxially and proximately with said second plate, having a small sector magnetically polarized in said opposite radial direction and a large sector magnetically polarized in said one radial direction, said plates being disposed, when no angular torque is exerted by said spirals, such that the small sectors of said second and third plates are substantially 180 degrees displaced and such that the half of said first plate diameter polarized the same as the small sector of said second plate is substantially aligned with the center of said small sector of said second plate.

7. In a gyro intrument as set forth in claim 6, the compensator wherein said small sector of said second plate is about 110 degrees in angular width, and wherein said small sector of said third plate is about 110 degrees in angular width.

8. In a gyro instrument having a spiral current conductor arrangement between the relatively rotatable rotor bearing structure and gimbal support therefor, a compensator for torque introduced by the spiral arrangement comprising a first magnetized plate coupled with said rotor bearing structure, a second magnetized plate coupled with said gimbal coaxially and proximately with said first plate, said first and second plates being magnetized and disposed such that the torque therebetween due to the interaction of their magnetic fields is substantially proportional to the sine of the angular displacement therebetween and in a direction opposite to that of the spiral arrangement torque, and a third magnetized plate coupled with said rotor bearing structure coaxially and proximately with said second plate, said second and third plates being disposed and magnetized such that the torque therebetween due to the interaction of their magnetic fields is substantially equal to said spiral arrangement torque less the torque between said first and second plates and in a direction opposite to that of said spiral arrangement torque.

9. In an arrangement including two relatively rotatable parts coupled together by a resilient spiral structure, a torque compensator comprising a first member mounted on one of said parts and having magnetic poles along one axis thereof, a second member mounted on the other of said parts and producing a unidirectional magnetic field, said first member being disposed in the field of said second member, a cylindrical member coupled with one of said parts having a small sector magnetically polarized in one radial direction and a large sector magnetically polarized in the opposite radial direction, an annular cylindrical member coupled with the other of said parts and disposed coaxially and proximately with said cylindrical member and having a small sector magnetically polarized in said opposite radial direction and a large sector magnetically polarized in said one radial direction, both of said small sectors being about 110 degrees in angular width.

10. An arrangement for producing between relatively rotatable parts torques which increase substantially linearly with angular displacements of said parts from a neutral position and which act in the same angular directions as said displacements, comprising first means coupled with one of said parts, second means coupled with the other of said parts, said first and second means being disposed and constructed to interact magnetically to produce a torque between said parts substantially proportional to the sine of the angular displacement therebetween and in the same direction as said displacement, and third means coupled with said other part, said first and third means being disposed and constructed to interact magnetically to produce a torque between said parts substantially equal to said linearly increasing torque less the torque between said first and second means and in the same direction as said displacement.

ROBERT G. BALLARD.
JOHN E. LUNDBERG.

References Cited in the file of this patent

UNITED STATES PATENTS

| Number | Name | Date |
| --- | --- | --- |
| 2,126,855 | Wunsch et al. | Aug. 16, 1938 |
| 2,209,735 | Lauck | July 30, 1940 |
| 2,246,738 | Lauck | June 24, 1941 |
| 2,298,573 | Little | Oct. 13, 1942 |
| 2,401,160 | Jewell | May 28, 1946 |
| 2,420,607 | Mendelsohn | May 13, 1947 |
| 2,504,170 | Wong | Apr. 18, 1950 |